US006935567B2

(12) United States Patent
Saga et al.

(10) Patent No.: US 6,935,567 B2
(45) Date of Patent: Aug. 30, 2005

(54) INCUBATOR

(75) Inventors: Tadahisa Saga, Gunma (JP); Takashi Arai, Gunma (JP); Hidetoshi Shinya, Gunma (JP); Yuichi Tamaoki, Ora-Gun (JP)

(73) Assignees: Sanyo Electric Co., Ltd., Osaka (JP); Sanyo Electric Biomedical Co., Ltd., Osaka (JP)

( * ) Notice: Subject to any disclaimer, the term of this patent is extended or adjusted under 35 U.S.C. 154(b) by 0 days.

(21) Appl. No.: 10/730,801

(22) Filed: Dec. 8, 2003

(65) Prior Publication Data

US 2004/0112969 A1 Jun. 17, 2004

(30) Foreign Application Priority Data

Dec. 9, 2002 (JP) ....................................... 2002-356824
Dec. 9, 2002 (JP) ....................................... 2002-356834

(51) Int. Cl.[7] ................................................ A01K 41/00
(52) U.S. Cl. ...................... 236/2; 236/5; 237/3; 237/14
(58) Field of Search ......................... 236/2, 3, 5; 237/3, 237/14

(56) References Cited

U.S. PATENT DOCUMENTS 4,840,771 A * 6/1989 Williamson et al. ........ 422/104
6,049,924 A * 4/2000 Prows et al. ................... 5/427

FOREIGN PATENT DOCUMENTS

JP 07308183 A * 11/1995 ............ C12M/1/00

* cited by examiner

*Primary Examiner*—Marc Norman
(74) *Attorney, Agent, or Firm*—Darby & Darby

(57) ABSTRACT

The present invention provides an incubator which can release pressure applied to a vessel side by upper heating means, and can simplify an opening/closing structure of a reaction chamber. The gist of the present invention resides in an incubator comprising a reaction chamber disposed in an incubator body; a heat conductive reaction block disposed in the reaction chamber to hold one or plural vessels containing reaction samples; a cover for covering an upper part of the reaction chamber in an openable manner; upper heating means positioned on a lower surface of the cover to heat an upper part of the vessel held by the reaction block; and pressure means for pressing the upper heating means to the vessel side; the reaction block being heated/cooled while the upper part of the vessel is heated by the upper heating means, to incubate the reaction sample; wherein the cover is disposed rotatably and movably in a horizontal direction with respect to the incubator body.

9 Claims, 15 Drawing Sheets

INCUBATOR

BACKGROUND OF THE INVENTION

The present invention relates to an incubator which changes a temperature of a reaction sample such as a deoxyribonucleic acid (DNA) obtained from blood, a specimen or the like to accelerate a reaction of incubation (amplification) or the like.

As a conventional incubator of such a type, there is an automatic DNA or RNA synthesizer or the like based on a phosphotriestel method. This synthesizer is constructed by covering an outer periphery of a reaction vessel with a heat block, mounting a thermomodule which has a heating/cooling function based on Peltier effect on the heat block, and burying the thermomodule.

The synthesizing method of DNA or the like based on the phosphotriestel method repeats four steps of masking, deprotection, drying and condensation in this order to accelerate DNA proliferation. Thus, the synthesizer is adapted to carry out the three steps of masking, drying and condensation by putting a sample mixed with DNA and various reagents/solutions in the reaction vessel, and controlling energization of the thermomodule by a thermistor to heat the heat block to +42° C., and the step of deprotection by changing an energization direction of the thermomodule to cool the heat block to +20° C. (e.g., see Jpn. UM Appln. KOKOKU Publication No. 62-44979).

However, in the process of repeating the four steps, the solution evaporated from the reaction vessel during the heating causes dew condensation on an upper part in the reaction vessel during the cooling, consequently creating a problem of a reduction in a water level of the solution. Therefore, there has been a problem that the specimen such as DNA is exposed from the solution to disable a proper reaction of incubation (amplification).

Conventionally, the aforementioned problems have been solved by an incubator 100 similar to that shown in FIG. 18. That is, in the incubator 100, a reaction chamber 102 is formed on an upper surface of an incubator body 101, and a reaction block 103 is mounted in the reaction chamber 102 to execute heating or cooling by heating means or cooling means (not shown). A heat insulating cover 105 comprising an upper heating plate 104 on its lower surface is disposed above the reaction chamber 102 in which the reaction block 103 has been mounted. This heat insulating cover 105 is rotated upward to be opened by pivotally supporting its rear end rotatably on the incubator body 101. A reference numeral 106 in the drawing denotes an operation panel attached to a front of an attaching section 107 disposed by being inclined obliquely forward at a predetermined angle. The operation panel 106 comprises an operation section 108 and a display section 109.

Thus, in a reaction vessel (not shown) mounted on the reaction block 103, the heat insulating cover 105 is rotated downward to close the reaction chamber 102, thereby applying pressure to the reaction vessel from above, and an upper part of the reaction vessel is heated by the upper heating plate 104 disposed on the lower surface of the heat insulating cover 105. Accordingly, dew condensation on the upper part of the reaction vessel which occurs in the incubation (amplification) step of DNA or the like is prevented.

However, in the above constitution, the heat insulating cover 105 must be opened when the reaction vessel is attached/detached. In such a case, since the heat insulating cover 105 is rotated upward to be opened as described above, the upper heating plate 104 disposed on the lower surface of the heat insulating cover 105 faces a space for replacing the reaction vessel. Thus, there is a danger that a worker who replaces the reaction vessel easily touches the upper heating plate 104 to be burned.

Thus, the heat insulating cover 105 may conceivably be moved in a linear direction to be opened/closed while its lower surface is maintained down. However, there is a problem of a complex structure because a mechanism is necessary to press the reaction chamber 102 by the heat insulating cover 105.

Furthermore, in the above constitution, the operation panel 106 which comprises the display section 109 for displaying an amplification state in the reaction chamber and the operation section 108 for setting an amplification state is fixed at a specified angle by the attaching section 107. Thus, there is a problem that if the device is installed in a position other than a fixed height, visibility of the display section 109 and operability of the operation section 108 are bad.

SUMMARY OF THE INVENTION

Thus, the present invention has been made to solve the conventional technical problems, and an object of the invention is to provide an incubator which can release pressure applied to a vessel side by upper heating means, and simplify an opening/closing structure of a reaction chamber.

Another object of the present invention is to provide an incubator which can adjust an operation panel comprising a display section, an operation section etc., to an angle to be easily seen and used even if a plurality of devices are installed on a shelf or the like to save space.

That is, a first aspect of the present invention is directed to an incubator comprising a reaction chamber disposed in an incubator body; a heat conductive reaction block disposed in the reaction chamber to hold one or plural vessels containing reaction samples; a cover for covering an upper part of the reaction chamber in an openable manner; upper heating means positioned on a lower surface of the cover to heat an upper part of the vessel held by the reaction block; and pressure means for pressing the upper heating means to the vessel side; the reaction block being heated/cooled while the upper part of the vessel is heated by the upper heating means, to incubate the reaction sample; wherein the cover is disposed rotatably and movably in a horizontal direction with respect to the incubator body.

According to the present invention, the incubator comprises the reaction chamber disposed in the incubator body; the heat conductive reaction block disposed in the reaction chamber to hold one or plural vessels containing the reaction samples; the cover for covering the upper part of the reaction chamber in an openable manner; the upper heating means positioned on the lower surface of the cover to heat the upper part of the vessel held by the reaction block; and the pressure means for pressing the upper heating means to the vessel side. In this case, the reaction block is heated/cooled while the upper part of the vessel is heated by the upper heating means to incubate the reaction sample, and the cover is rotated and freely moved in the horizontal direction with respect to the incubator body. Thus, it is possible to release pressure applied by the upper heating means to the vessel side and simplify the opening/closing structure of the reaction chamber.

A second aspect of the present invention is directed to the above incubator, wherein the cover is rotatable to be freely brought into contact with and separated from the vessel held by the reaction block, and is movable in the horizontal direction in a state in which a lower surface thereof is down, to open the upper part of the reaction chamber.

According to the invention of the second aspect, the cover is rotated to be freely brought into contact with and separated from the vessel held by the reaction block, separated from the vessel, and moved in the horizontal direction in the state in which the lower surface thereof is down to open the upper part of the reaction chamber. Thus, since the upper heating means disposed on the lower surface of the cover is moved in the horizontal direction with its face down when the cover is opened, it is possible to prevent burning of a worker by the upper heating means.

A third aspect of the present invention is directed to the above incubator, further comprising pressing means abutted on a cap peripheral edge of the vessel, wherein the pressing means is movable with respect to the upper heating means.

According to the invention of the third aspect, the pressing means is disposed to be abutted on the cap peripheral edge of the vessel, and the pressing means is movable with respect to the upper heating means. Thus, it is possible to prevent opening of the cap of the vessel by the pressing means. Moreover, since the pressing means is movable with respect to the upper heating means, the amount of pressure (amount of crushing) to the cap of the vessel can be regulated, and no particular alignment of the pressing means is necessary. Thus, convenience of the incubator is improved.

A fourth aspect of the present invention is directed to the above incubator, wherein the pressing means is attached to a lower surface of the upper heating means, and held in a neutral position or a fixed position in a separated state from the vessel.

According to the invention of the fourth aspect, the pressing means is attached to the lower surface of the upper heating means, and held in the neutral position or the fixed position in the separated state from the vessel. Thus, the pressing means is smoothly moved to facilitate alignment with the vessel.

A fifth aspect of the present invention is directed to the above incubator, wherein the pressing means is a plate material in which one or plural through-holes are formed.

According to the invention of the fifth aspect, the pressing means is a plate material in which one or plural through-holes are formed. Therefore, the upper heating means can be abutted on the vessel by a simple structure without any troubles.

A sixth aspect of the present invention is directed to the above incubator, wherein the pressing means is a plate material in which one or plural concaves are formed.

According to the invention of the sixth aspect, the pressing means is the plate material in which one or plural concaves are formed. Thus, heat can be conducted from the upper heating means through the pressing means to the vessel by a simple structure without any troubles.

A seventh aspect of the present invention is directed to an incubator comprising a reaction chamber disposed in an incubator body; a heat conductive reaction block disposed in the reaction chamber to hold one or plural vessels containing reaction samples; and a cover for covering an upper part of the reaction chamber in an openable manner; the reaction block being heated/cooled to incubate the reaction sample; wherein a display section is disposed in the incubator body to display an incubation state, and attached to the incubator body in such a manner that an angle to the incubator body is adjustable.

According to the invention of the seventh aspect, the incubator comprises the reaction chamber disposed in the incubator body; the heat conductive reaction block disposed in the reaction chamber to hold one or plural vessels containing the reaction samples; and the cover for covering the upper part of the reaction chamber in an openable manner. In this case, the reaction block is heated/cooled to incubate the reaction sample, and the display section disposed in the incubator body to display the incubation state is attached to the incubator body so as to be adjusted for an angle. Thus, the display section can be adjusted to an angle to be easily seen when a plurality of devices are installed on a shelf or the like to save space. Accordingly, usability of the incubator is improved.

An eighth aspect of the present invention is directed to an incubator comprising a reaction chamber disposed in an incubator body; a heat conductive reaction block disposed in the reaction chamber to hold one or plural vessels containing reaction samples; and a cover for covering an upper part of the reaction chamber in an openable manner; the reaction block being heated/cooled to incubate the reaction sample; wherein an operation section is disposed in the incubator body to set an incubation state, and attached to the incubator body in such a manner that an angle to the incubator body is adjustable.

According to the invention of the eighth aspect, the incubator comprises the reaction chamber disposed in the incubator body; the heat conductive reaction block disposed in the reaction chamber to hold one or plural vessels containing the reaction samples; and the cover for covering the upper part of the reaction chamber in an openable manner. In this case, the reaction block is heated/cooled to incubate the reaction sample, and the operation section disposed in the incubator body to set the incubation state is attached to the incubator body so as to be adjusted for an angle. Thus, the operation section can be adjusted to an angle to be easily used when a plurality of devices are installed on a shelf or the like to save space. Accordingly, usability of the incubator is improved.

A ninth aspect of the present invention is directed to an incubator comprising a reaction chamber disposed in an incubator body; a heat conductive reaction block disposed in the reaction chamber to hold one or plural vessels containing reaction samples; and a cover for covering an upper part of the reaction chamber in an openable manner; the reaction block being heated/cooled to incubate the reaction sample; wherein an operation panel comprising a display section for displaying an incubation state and an operation section for setting the incubation state is disposed in the incubator body, and the operation panel is attached to the incubator body in such a manner that an angle to the incubator body is adjustable.

According to the invention of the ninth aspect, the incubator comprises the reaction chamber disposed in the incubator body; the heat conductive reaction block disposed in the reaction chamber to hold one or plural vessels containing the reaction samples; and the cover for covering the upper part of the reaction chamber in an openable manner. In this case, the reaction block is heated/cooled to incubate the reaction sample, and the operation panel which comprises the display section for displaying the incubation state and the operation section for setting the incubation state and which is disposed in the incubator body is attached to the incubator body so as to be adjusted for an angle. Thus, the operation panel can be adjusted to an angle to be easily seen and used when a plurality of devices are installed on a shelf to save space. Accordingly, usability of the incubator is improved.

A tenth aspect of the present invention is directed to the above incubator, wherein the display section, the operation section or the operation panel is adjustable at a plurality of stages to the incubator body.

According to the invention of the tenth aspect, since the display section, the operation section or the operation panel can be adjusted for an angle with respect to the incubator body at the plurality of stages, the angle can be easily adjusted in accordance with an installation place. Thus, usability of the incubator is further improved.

DETAILED DESCRIPTION OF THE PREFERRED EMBODIMENTS

Figure 1:
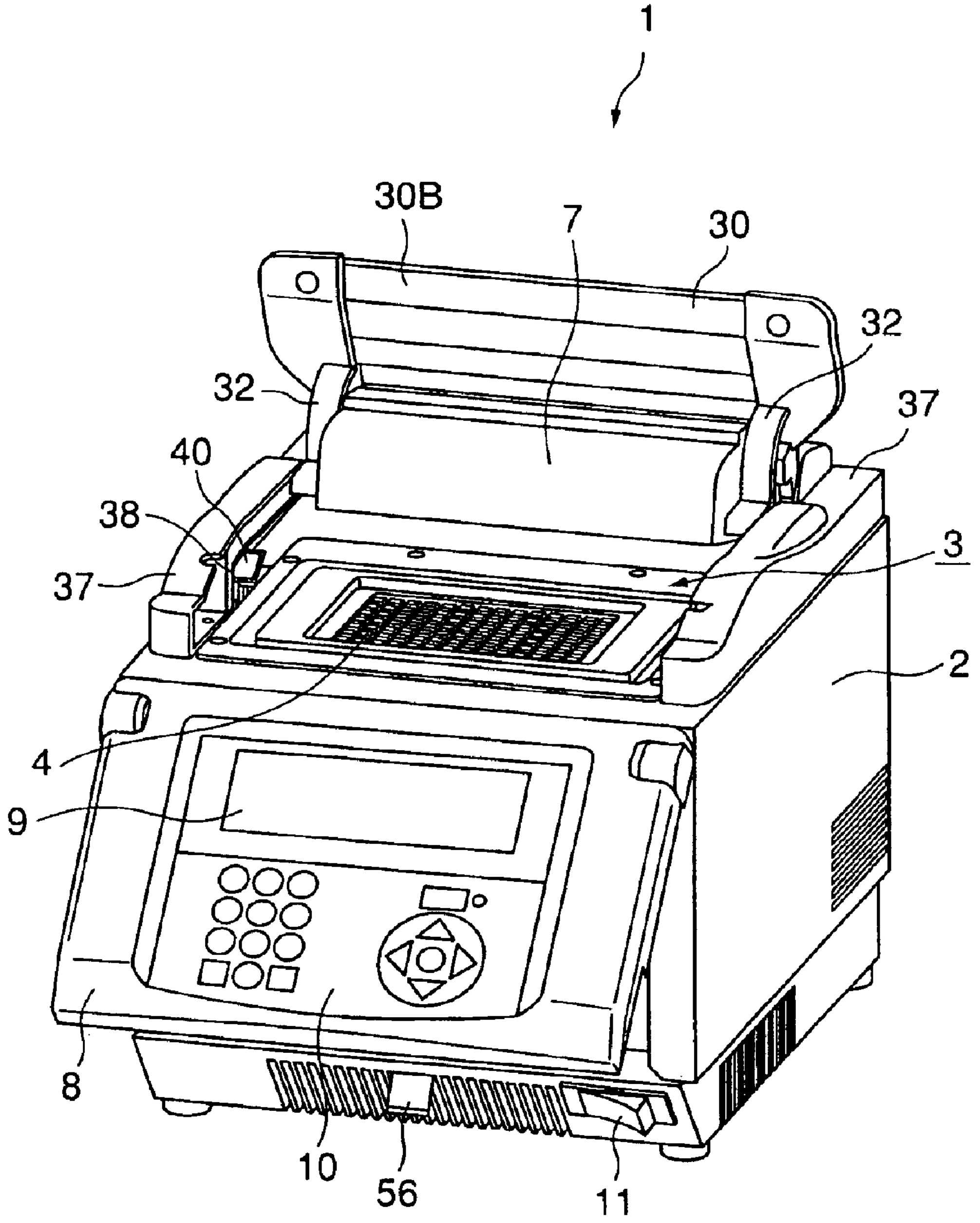
FIG. 1 is a perspective view of an incubator of the present invention.
Figure 2:
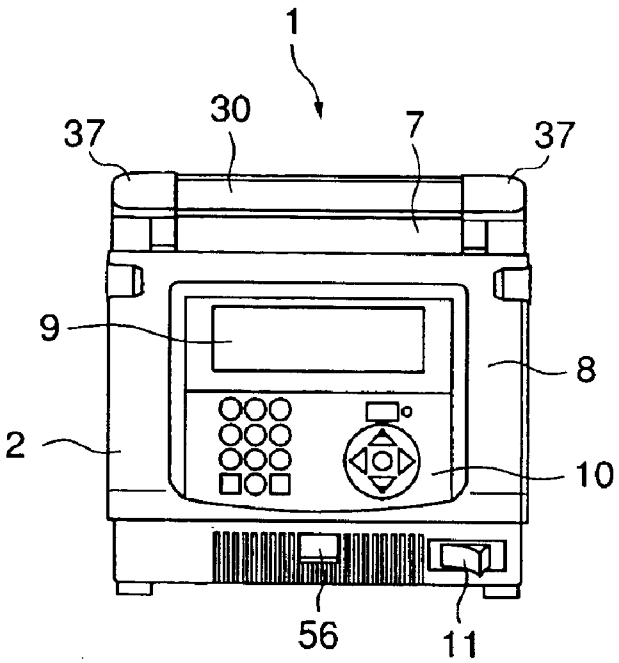
FIG. 2 is a front view of the incubator of the present invention.
Figure 3:
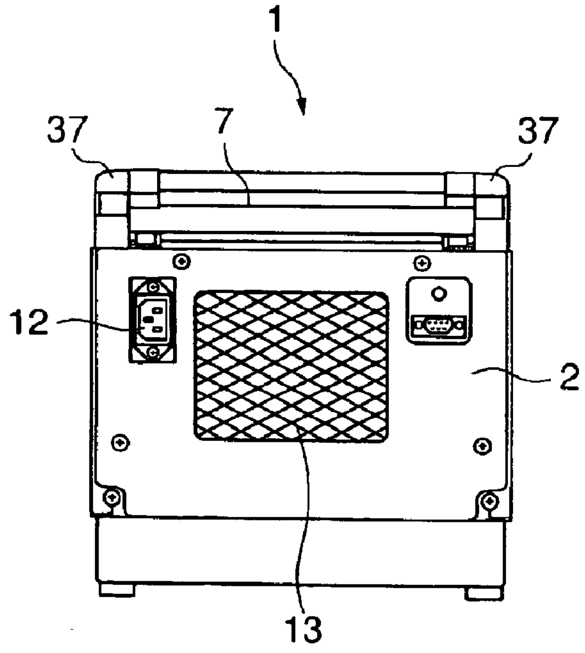
FIG. 3 is a backside view of the incubator of the present invention.
Figure 4:
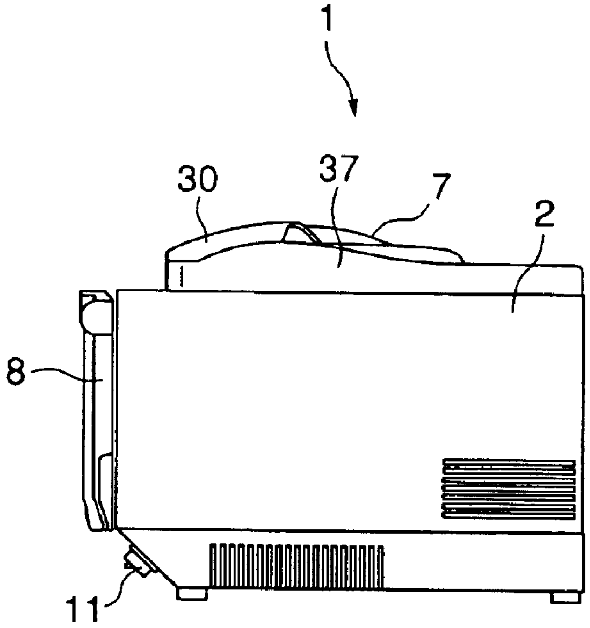
FIG. 4 is a side view of the incubator of the present invention.
Figure 5:
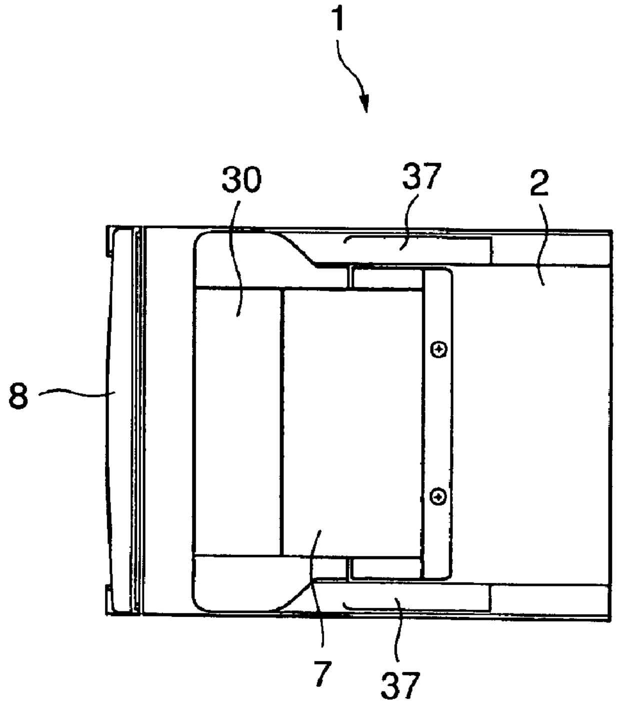
FIG. 5 is a plan view of the incubator of the present invention.
Figure 6:
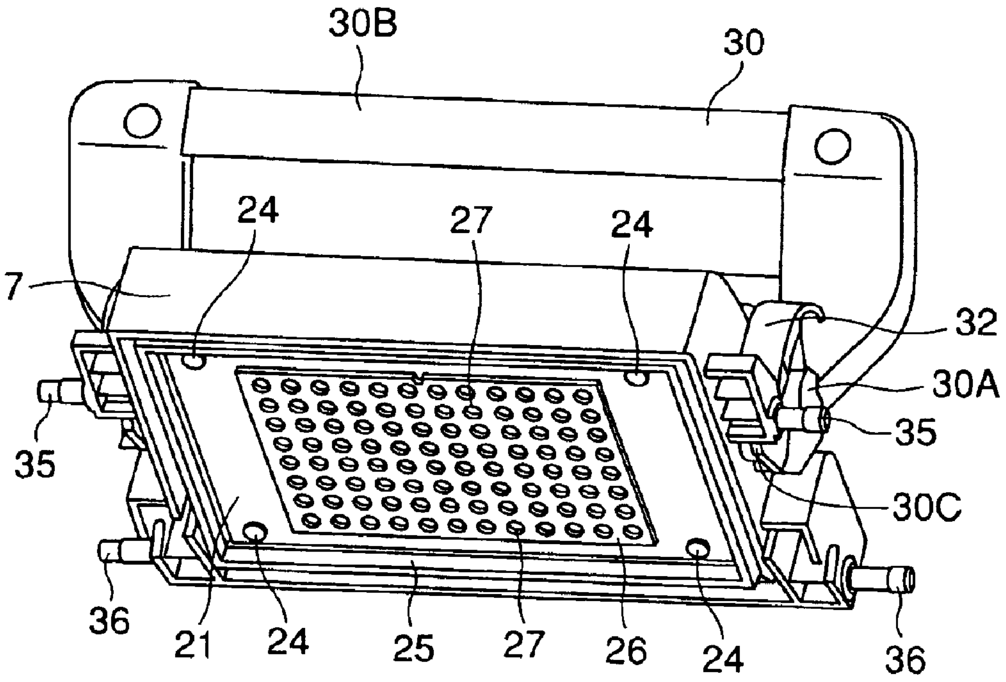
FIG. 6 is a perspective view of a heat insulating cover seen from bottom.

Next, the embodiment of the present invention will be described in detail with reference to the accompanying drawings. An incubator 1 of the embodiment is a device for realizing a DNA proliferation method called a PCR method which repeats, by a plurality of times, a cycle comprising a heat denaturation step of chromosome DNA as a reaction sample, an annealing step with a primer, and an elongation step of a chain.

The incubator 1 comprises an incubator body 2 on an upper surface of which a reaction chamber 3 is formed. A reaction block 4 made of a heat conductive material such as aluminum is disposed in the reaction chamber 3. A plurality of holding holes 6 are formed in the reaction block 4 to hold a reaction vessel 5 containing a reaction sample mixed with DNA, various reagents, a solution or the like to become a medium inside. A heat insulating cover 7 is disposed on the upper surface of the incubator body 2 to cover an upper part of the reaction chamber 3 in an openable manner. The heat insulating cover 7 will be detailed later.

In the incubator body 2, Peltier element is disposed to heat/cool the reaction block 4. On the front of the incubator body 2, there is disposed an operation panel 8 which comprises a display section 9 for displaying an incubation (amplification) state of the reaction sample in the reaction vessel 5 by heating/cooling of the reaction block 4, and an operation section 10 for setting an incubation (amplification) state of the reaction sample in the reaction vessel 5. A detailed structure of the operation panel 8 will be described later.

In the drawings, a reference numeral 11 below the operation panel 8 denotes a power switch of the incubator 1. A reference numeral 12 on the backside of the incubator body 2 denotes an outlet of a power plug; and 13 an exhaust port for discharging an exhaust gas from the incubator body 2 to the outside.

In the aforementioned constitution, a controller carries out a heat denaturation step of controlling a heater, setting the reaction sample in the reaction vessel 5 held by the holding holes of the reaction block 4 to a heat denaturation temperature of, e.g., +94° C., and denaturing the reaction sample by heat. Then, the controller controls the Peltier element, and cools the reaction block 4 to, e.g., +37° C., to carry out an annealing step and an elongation step of the reaction sample contained in the reaction vessel 5 to be denatured by heat. The controller repeats a cycle which comprises the heat denaturation step, the annealing step and the elongation step by a plurality of times, e.g., 30 times, to incubate (amplify) DNA or the like by the PCR method.

Next, description will be made of an opening/closing mechanism of the heat insulating cover 7 with reference to FIGS. 6 to 13.

The heat insulating cover 7 has an opening on a lower side, and upper heating means 20 is disposed in the heat insulating cover 7 oppositely to the opening to heat an upper part (cap 5A) of the reaction vessel 5. The upper heating means 20 comprises a heating plate 21, an upper part heater 22 for heating the heating plate 21, a support plate 23 for holding the heating plate 21 in the heat insulating cover 7, and a plurality of connection members (according to the embodiment, 4 are used because they are disposed at four corners of the heating plate 21) 24 for connecting the heating plate 21 to the support plate 23.

In the connection member 24, a spring member (pressure means) 29 is disposed which is positioned between the support plate 23 and the heating plate 21 to be pressed in an elongation direction. Outer peripheries of the support plate 23, the upper part heater 22 and the heating plate 21 are surrounded with a gasket 25.

A pressing plate (pressing means) 26 made of a heat conductive material is disposed below the heating plate to be abutted on a peripheral edge of the cap 5A of the reaction vessel 5. In the pressing plate 26, a plurality of through-holes 27 (according to the embodiment, the number of the through-holes is plural because a plurality of reaction vessels 5 can be housed, but the number may be one if only one reaction vessel 5 is housed) are formed which are inserted through the upper part of the cap 5A of the reaction vessel 5 housed in the reaction block 4 to pressurize the peripheral edge of the cap 5A.

Thus, the heating plate 21 of the upper heating means 20 can be abutted on the reaction vessel 5 by a simple structure without any troubles. According to the embodiment, the through-holes 27 are formed. However, concaves other than the through-holes may be formed. In such a case, heat can be conducted from the upper heating means 20 through the pressing plate 26 to the reaction vessel 5 by a simple structure without any troubles.

An attaching hole (not shown) is formed to be tapered upward in the pressing plate 26. The attaching hole is attached to a lower surface of the heating plate 21 while a small gap is interpolated by a conical screw 28 of a shape in which an upper part (head part) is tapered downward. Thus, the pressing plate 26 can be moved in a fixed range with respect to the upper heating means 20. In a separated state from the reaction vessel 5, the pressing plate 26 is held in a neutral position by its own weight. Not limited to the embodiment in which it is held in the neutral position by its own weight, the pressing plate 26 may be held in the neutral position mechanically, electrically or magnetically. The holding position is not limited to the neutral position, but it may be a preset position (fixed position).

A gripping member 30 is disposed on an upper surface of the heat insulating cover 7. The gripping member 30 comprises a main body 30A freely rotated upward by a gripping shaft 31 disposed back and forth and left and right in the heat insulating cover 7, and a gripping section 30B formed integrally with the main body 30A. In the main body 30A of the gripping member 30, a gripping and locking section 32 which is positioned in each of both sides of the heat insulating cover 7 is formed integrally with the gripping member 30. The gripping and locking section 32 exhibits an upward circular-arc shape when the gripping section 30B is roughly horizontal, and an upper edge of its end is slightly notched to be tapered so that it can be easily engaged with a later-described engaging section 40.

Additionally, in the main body 30A of the gripping member 30, a locking section 30C which is similarly positioned in each of both sides of the heat insulating cover 7 and which comprises a downward opened notch is formed in, e.g., a position opposite the gripping section 30B. When the gripping section 30B is rotated upward around the gripping shaft 31 to be moved to a roughly vertical position (states of FIGS. 11 and 12), the locking section 30C is engaged with a locking pin 33 disposed beforehand in each of both sides of the heat insulating cover 7 in this position to regulate rotation of the gripping member 30.

On both sides of the heat insulating cover 7, front guide shafts 35 are disposed on a lower part of the heat insulating cover 7 and before the gripping shaft 31, and rear guide shafts 36 are disposed on a rear part of the heat insulating cover 7.

On the other hand, on the upper surface of the incubator body 2 of the incubator 1, rail members 37 positioned on both sides of the heat insulating cover 7 are disposed. In each rail member 37, a front guide groove 38 and a rear guide groove 39 are formed on a surface of the heat insulating cover 7 side. The front guide groove 38 is constituted by forming an erect groove 38A roughly vertically erected from a lower part of the front side of the rail member 37, forming a horizontal groove 38B made roughly horizontal from an upper end of the erect groove 38A to a rear side, and communicating these grooves with each other. The rear guide groove 39 comprises a groove formed roughly horizontal from a center to the rear side on a lower part of the rail member 37.

Furthermore, in the rail member 37, an engaging section 40 which detachably locks the locking section 30C formed in the gripping member 30 is formed to project to the heat insulating cover 7 side.

Figure 10:
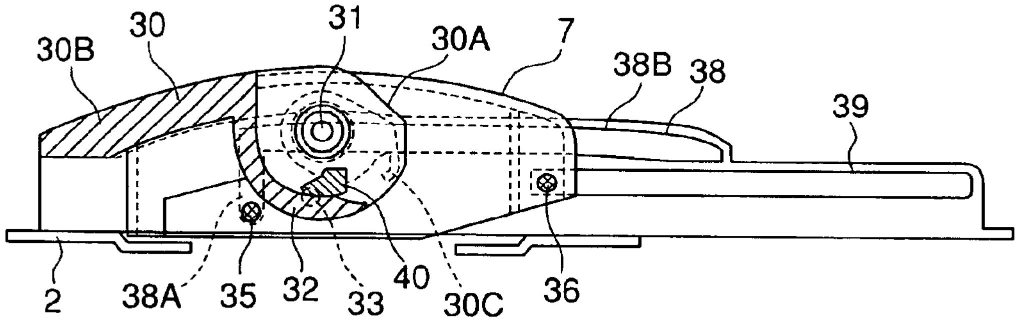
FIG. 10 is a sectional view showing a closed state of the heat insulating cover.

Next, description will be made of an operation of the incubator 1, pressurizing of the reaction vessel 5 by the heat insulating cover 7, and an opening/closing operation of the heat insulating cover 7 in the aforementioned constitution. First, a closed state of the heat insulating cover 7 will be described. In the heat insulating cover 7, as shown in FIG. 10, each of the front guide shafts 35 disposed in both sides is positioned in a lower part of the erect groove 38A of the front guide groove 38 of the rail member 37, and the rear guide shaft 36 is positioned in a front part of the rear guide groove 39 of the rail member 37. For the gripping member 30, the gripping section 30B becomes roughly horizontal, and the gripping and locking section 32 is engaged with the engaging section 40 formed in the rail member 37.

Figure 7:
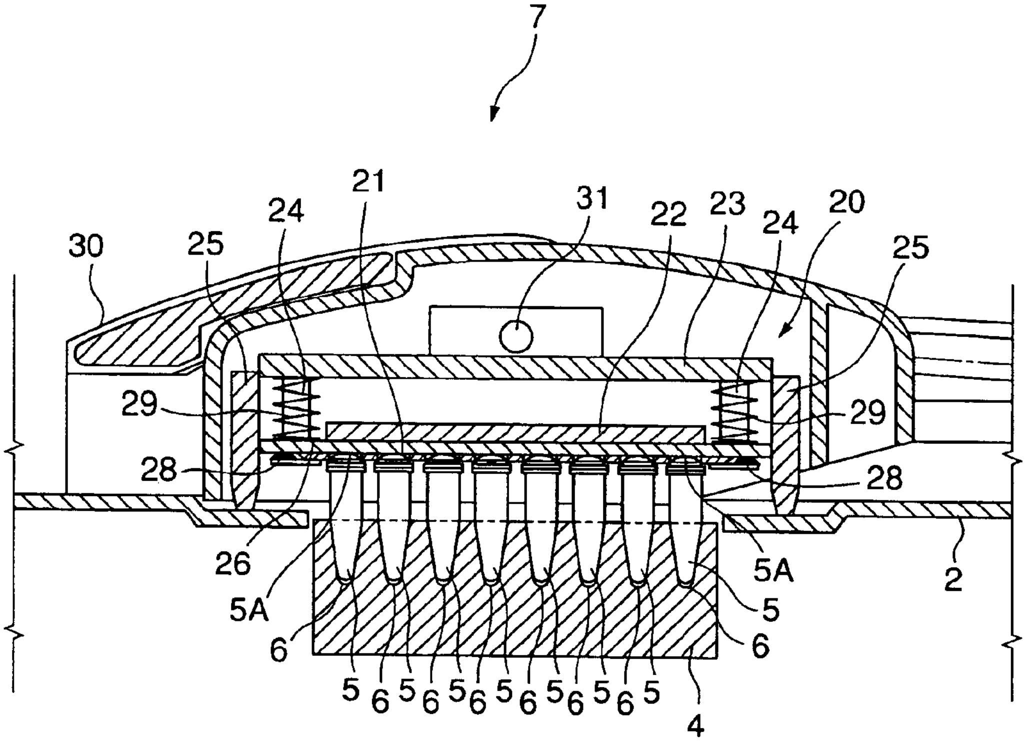
FIG. 7 is a sectional view showing a state of pressure applied by the heat insulating cover to a reaction vessel 5, and a closed state of the heat insulating cover.

In this state, as shown in FIG. 7, the reaction vessel 5 housed in the reaction block 4 is pressurized by the heat insulating cover 7 from above, and the cap 5A of the reaction vessel 5 is positioned in the through-hole 27 of the pressing plate 26. At this time, as the heat insulating cover 7 is closed, a pressing force of the spring member 29 disposed in the connection member 24 presses the heating plate 21 downward. For the pressing plate 26, an upper part of the conical screw 28 enters the attaching hole to bond the pressing plate 26 to the heating plate 21. Thus, the cap 5A of the reaction vessel 5 is abutted through the through-hole 27 on the heating plate 21. Additionally, the peripheral edge of the cap 5A of the reaction vessel 5 is pressed by the pressing plate 26.

In this state, the reaction chamber 3 is hermetically closed to carry out incubation (amplification) of DNA or the like by the PCR method similar to the above. According to the embodiment, the cap 5A of the reaction vessel 5 is pressed from above, and the heating plate 21 as the upper heating means 20 is abutted thereon. Thus, by controlling the upper part heater 22 of the upper heating means 20, it is possible to prevent dew condensation on the upper part of the reaction vessel 5 during heating/cooling of the reaction vessel 5.

Since the pressing plate 26 is pressed downward by the spring member 29, it is possible to prevent an inconvenience of opening of the cap 5A of the reaction vessel 5 during the incubation (amplification) of DNA or the like. Further, the peripheral edge of the cap 5A can be pressed by the peripheral edge of the through-hole 27 formed in the pressing plate 26, and thus it is possible to prevent deformation of the cap 5A during heating of the upper part of the reaction vessel 5.

Figure 11:
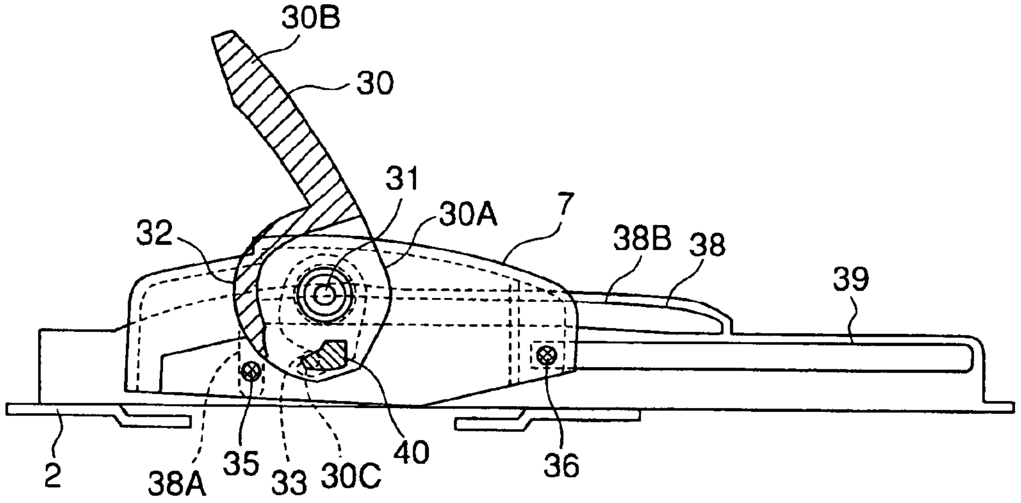
FIG. 11 is a sectional view showing a released state of engagement of a gripping part of he heat insulating cover.

Next, the opening operation of the heat insulating cover 7 will be described. First, the gripping section 30B of the gripping member 30 is rotated upward around the gripping shaft 31 to release engagement between the gripping and locking section 32 and the engaging section 40 formed in the rail member 37. Further, as shown in FIG. 11, the gripping section 30B is rotated upward to engage the locking section 30C formed in the main body 30A with each of the locking pins 33 formed on both sides of the heat insulating cover 7. Accordingly, rotation of the griping member 30 is regulated.

Figure 8:
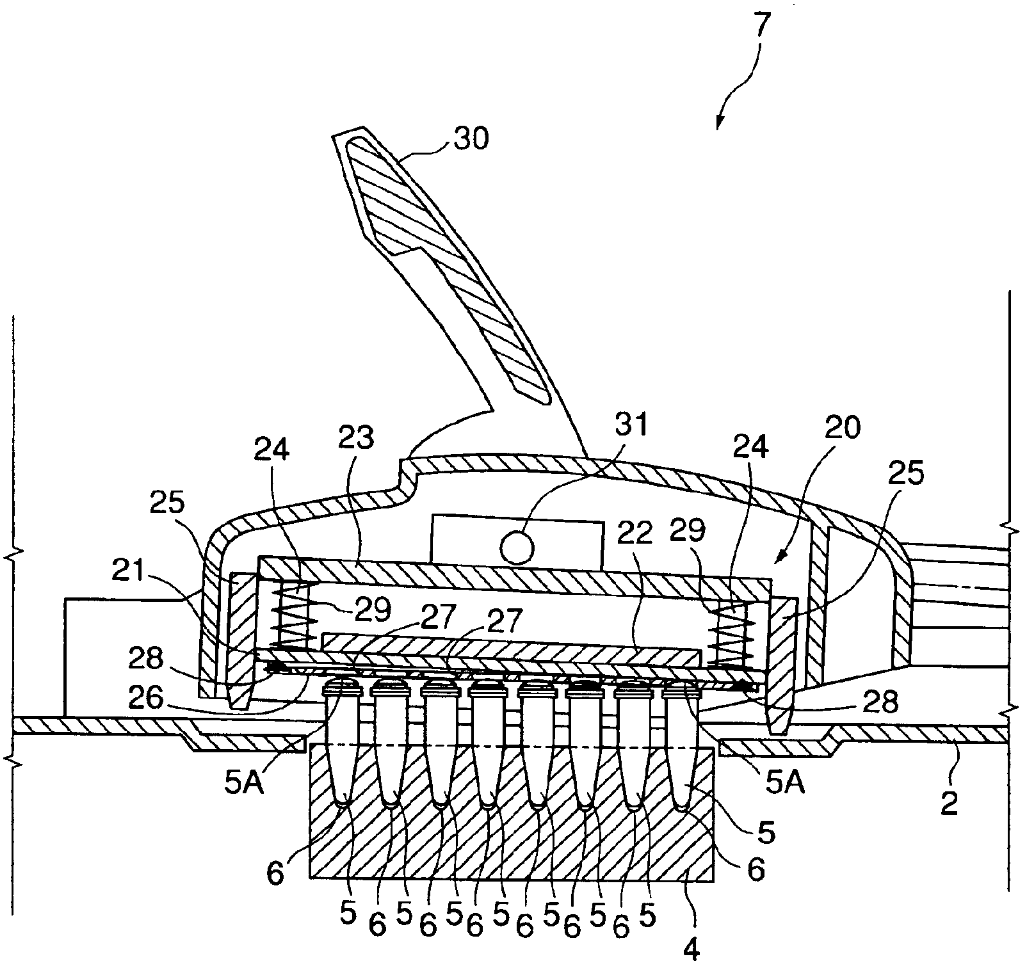
FIG. 8 is a sectional view sowing a state of pressure applied by the heat insulating cover to the reaction vessel 5, and a roughly opened state of the heat insulating cover.
Figure 9:
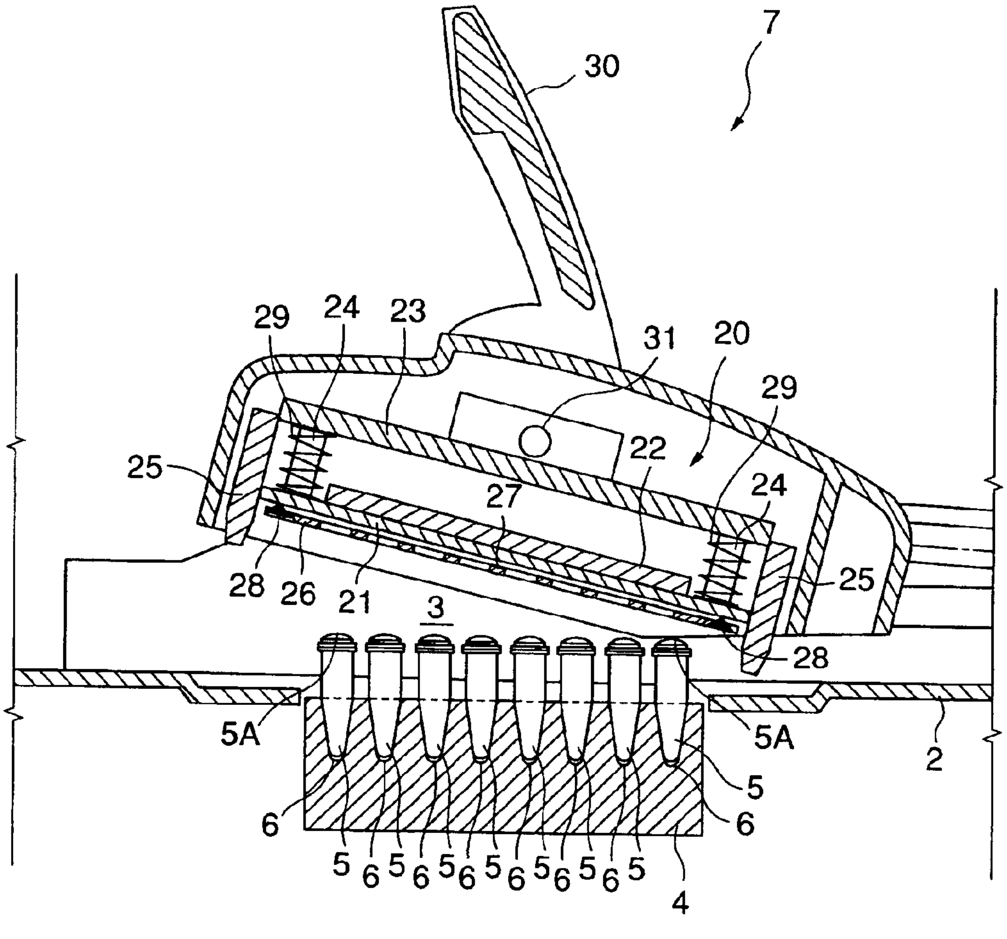
FIG. 9 is a sectional view showing a state of pressure applied by the heat insulating cover to the reaction vessel 5, and an opened state of the heat insulating cover.
Figure 12:
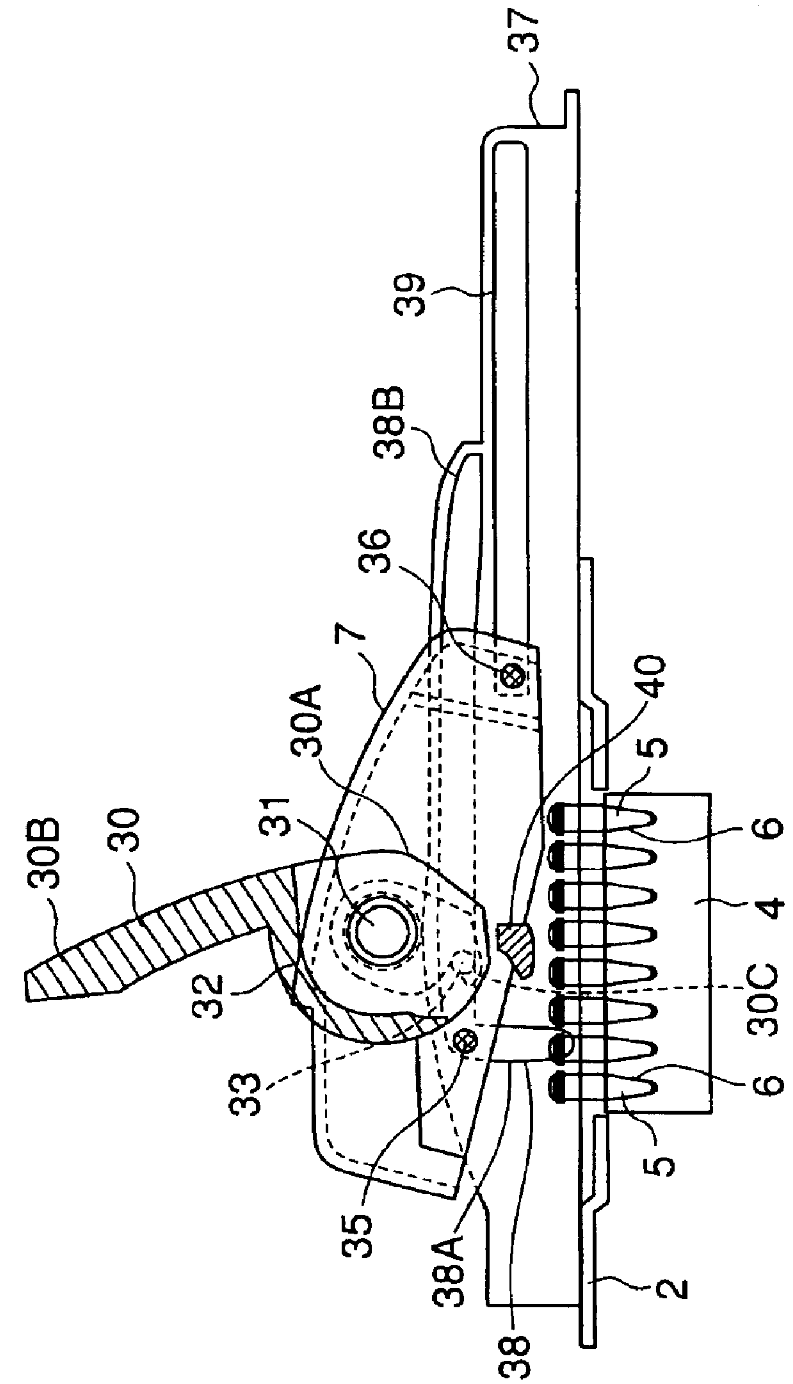
FIG. 12 is a sectional view showing a roughly opened state of the heat insulating cover.

Then, in the state in which the rotation of the gripping member 30 is regulated, the heat insulating cover 7 is rotated upward around the rear guide shaft 36 together with the gripping member 30. At this time, as shown in FIG. 12, the front guide shaft 37 is raised along the erect groove 38A of the front guide groove 38. Accordingly, as shown in FIGS. 8 and 9, outside air enters the heat insulating cover 7 to release the pressure applied by the heat insulating cover 7 to the reaction chamber 3.

At this time, the pressing plate 26 is released from the pressing force of the spring member 29 to retreat the conical screw 28 from the attaching hole, and then the pressing plate 26 is held in a neutral position by its own weight.

Figure 13:
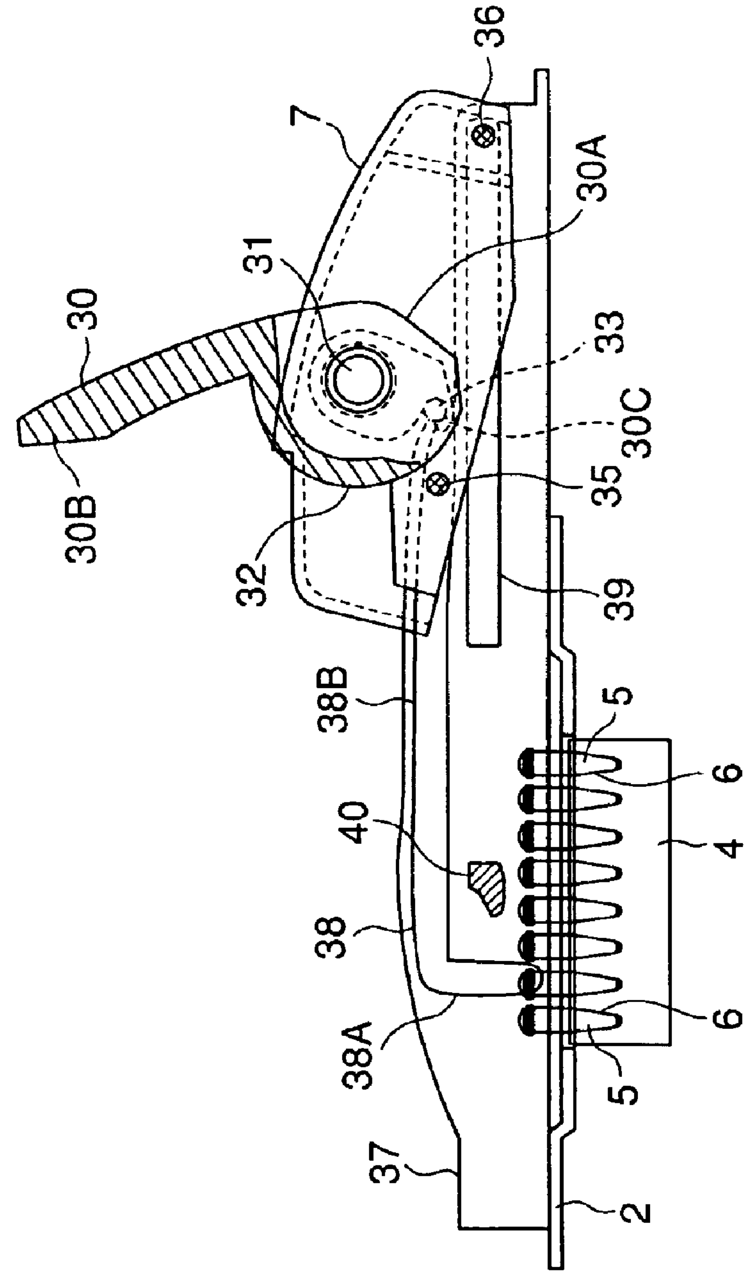
FIG. 13 is a sectional view showing a completely opened state of the heat insulating cover.

Subsequently, in the state in which the rotation of the gripping member 30 is regulated, the front guide shaft 35 of the heat insulating cover 7 rotates the heat insulating cover 7 upward around the rear guide shaft 36 together with the gripping member 30 to the upper end of the erect groove 38A of the front guide groove 38. Then, as shown in FIG. 13, the front guide shaft 35 and the rear guide shaft 36 are horizontally moved backward respectively along the horizontal groove 38*a* of the front guide groove 38 and along the rear guide groove 39 to horizontally move the heat insulating cover 7 backward together with the gripping member 30. Accordingly, the reaction chamber 3 of the incubator body 2 is released from the heat insulating cover 7.

As described above, the heat insulating cover 7 can be rotated and freely moved in the horizontal direction with respect to the incubator body 2. Thus, it is possible to simplify the structure of releasing the pressure applied by the upper heating means 22 to the reaction vessel 5 side and opening/closing the reaction chamber 3. The heat insulating cover 7 is rotated to be freely brought into contact with and separated from the reaction vessel 5 held in the reaction block 4, separated from the reaction vessel 5, and horizontally moved while its lower surface is down, whereby the upper part of the reaction chamber 3 can be opened. Thus, when a worker removes the reaction vessel 5 in the opened state of the heat insulating cover 7, it is possible to prevent burning by the heating plate 21 of the upper heating means 20 or the pressing plate 26.

As described above, since the pressing plate 26 is disposed to be movable with respect to the heating plate 21 of the upper heating means 20, it is held in the neutral position by its own weight in the separated state of the reaction vessel 5. Thus, when the heat insulating cover 7 is closed, the pressing plate 26 is smoothly moved to facilitate alignment with the reaction vessel 5, and no special alignment is necessary between the through-hole 27 formed in the pressing plate 26 and the cap 5A of the reaction vessel 5. Accordingly, the cap 5A of the reaction vessel 5 can be easily pressed to improve convenience of the incubator.

Since the pressing plate 26 is attached to the heating plate 21 so as to be moved in the fixed range with respect to the upper heating means 20, the amount of pressure (amount of crushing) to the cap 5A of the reaction vessel 5 can be easily regulated. Thus, it is not necessary to dispose any special members such as a frame to regulate the amount of pressure to the cap 5A.

According to the embodiment, in the pressing plate 26 for pressing the cap 5A of the reaction vessel 5, the through-hole 27 is formed to insert the plate through the cap 5A, thereby abutting the upper surface of the cap 5A on the heating plate 21. However, if heat conductivity of the pressing plate 26 is high, similar effects can be obtained even if the through-hole 27 is a concave as described above.

Next, a structure of the operation panel 8 will be described with reference to FIGS. 14 to 17. As described above, the operation panel 8 is a panel member which comprises the display section 9 for displaying the incubation (amplification) state of the reaction sample in the reaction vessel 5 by the heating/cooling of the reaction block 4, and the operation section 10 connected to the controller to set the incubation (amplification) state of the reaction sample in the reaction vessel 5. The operation panel 8 is attached to the front of the incubator body 2 so as to be freely rotated forward around a rotary shaft 51 which comprises an oil damper (rotary damper) 50 disposed in an upper end.

In the operation panel 8, a panel support member 52 of a circular-arc shape is disposed with respect to the rotary shaft 51. An engaging groove 53 of a similar circular-arc shape is formed in the support member 52. A plurality (4 according to the embodiment) of angle adjustment grooves 54 notched horizontally or downward are formed in the engaging groove 53.

On the other hand, a partition wall 60 is disposed on the front of the incubator body 2 by interpolating a predetermined gap with the operation panel 8, and a pressing member attaching section 61 is attached to a lower part of the partition wall 60. A spring member 62 pressed in a degeneration direction is attached to the pressing member attaching section 61, and an operation lever 56 is connected through a connection member 63. An operation lever holding section 64 is fixed to the connection member 63. The operation lever holding section 64 is held to be moved up and down by a support plate 66 which has a long hole 65 formed to be long up and down. The support plate 66 is attached to the partition wall 60.

Figure 14:
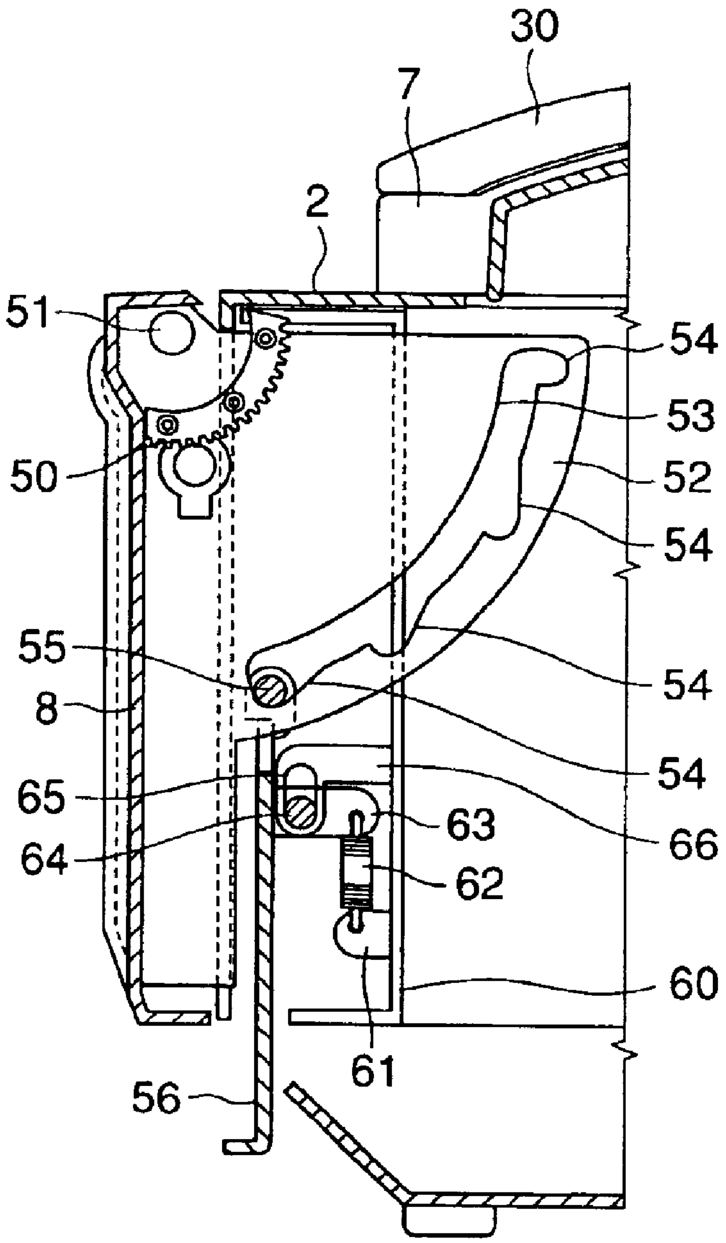
FIG. 14 is a sectional view showing a state in which an operation panel is held in a lowermost angle adjustment groove.

The operation lever 56 is disposed to be extended to the lower part of the incubator body 2, and a support shaft 55 is attached to its upper end to be inserted into the engaging groove 53 of the support member 52. Normally, the operation lever 56 is pressed downward by a pressing force of the spring member 62. The support shaft 55 disposed on the upper end of the operation lever 56 is held in one of the angle adjustment grooves 54 formed in the engaging groove 53, the lowermost angle adjustment groove 54 in a state in which the operation panel 8 is vertical as shown in FIG. 14.

Figure 15:
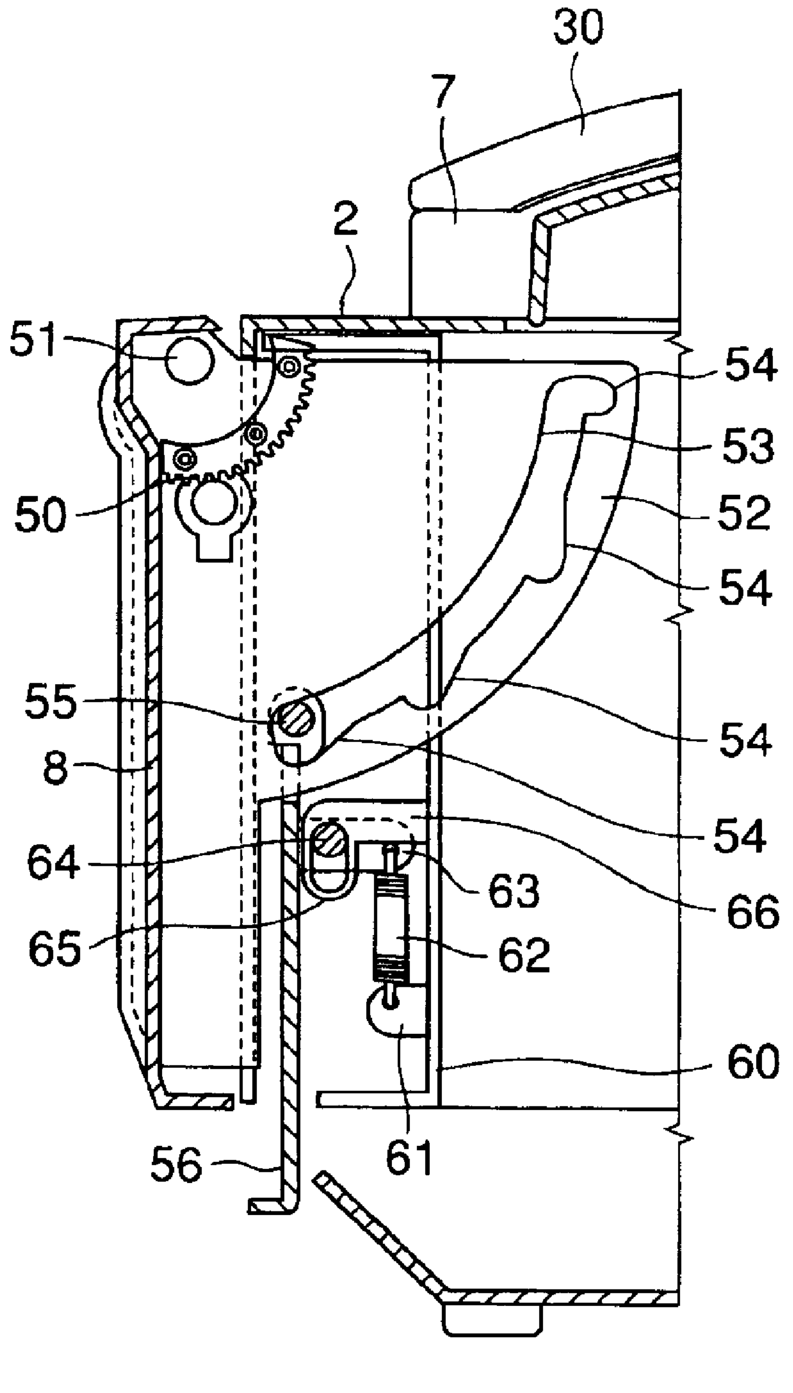
FIG. 15 is a sectional view of the operation panel showing a state in which an operation lever is operated.

In the above constitution, when an angle of the operation panel 8 is adjusted, as shown in FIG. 15, it is pushed up to move the operation lever holding section 64 upward by an amount equivalent to a length of the long hole 65 formed in the support plate 66 against the pressing force of the spring member 62. Accordingly, the support shaft 55 disposed on the upper end of the operation lever 56 is abutted on the upper edge of the engaging groove 53 to release regulation by the angle adjustment groove 54.

Figure 16:
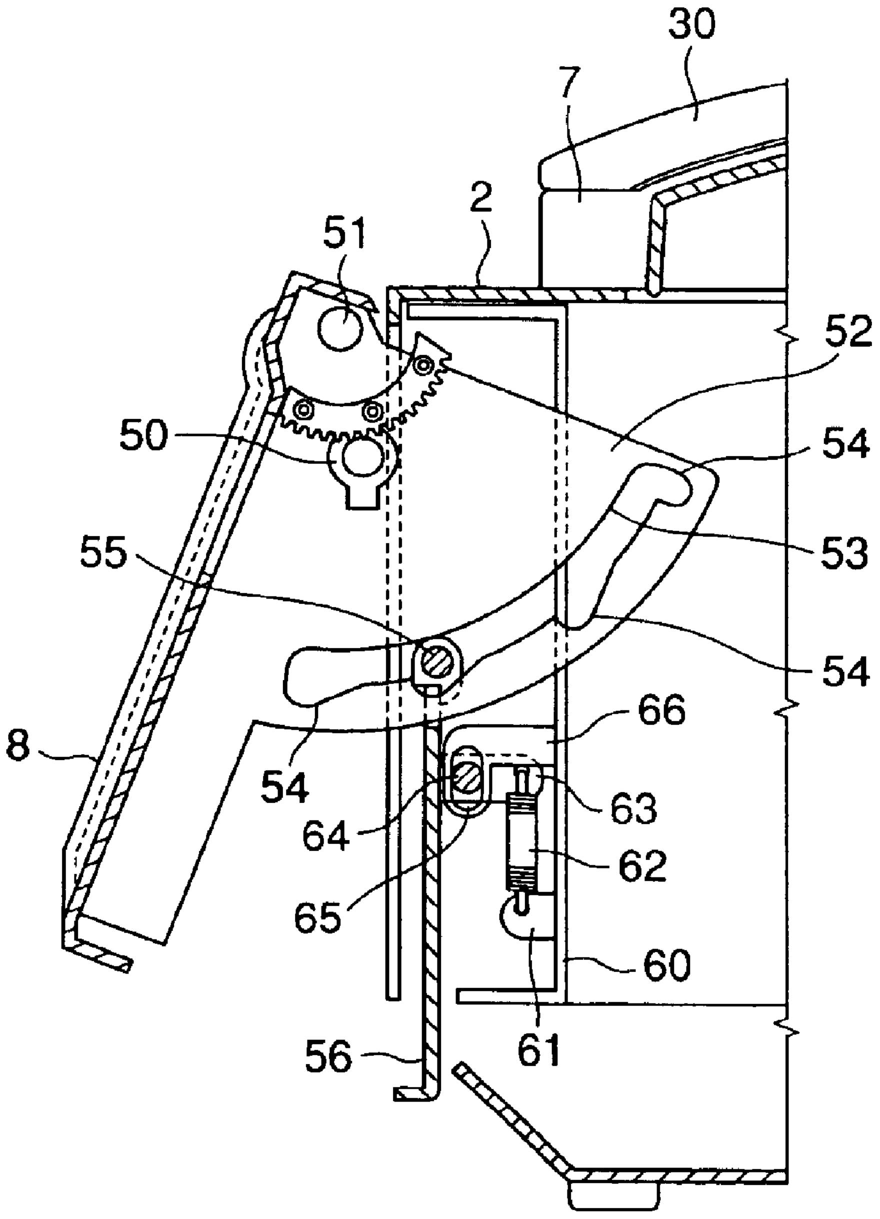
FIG. 16 is a sectional view showing a state in which the operation panel is rotated forward.
Figure 17:
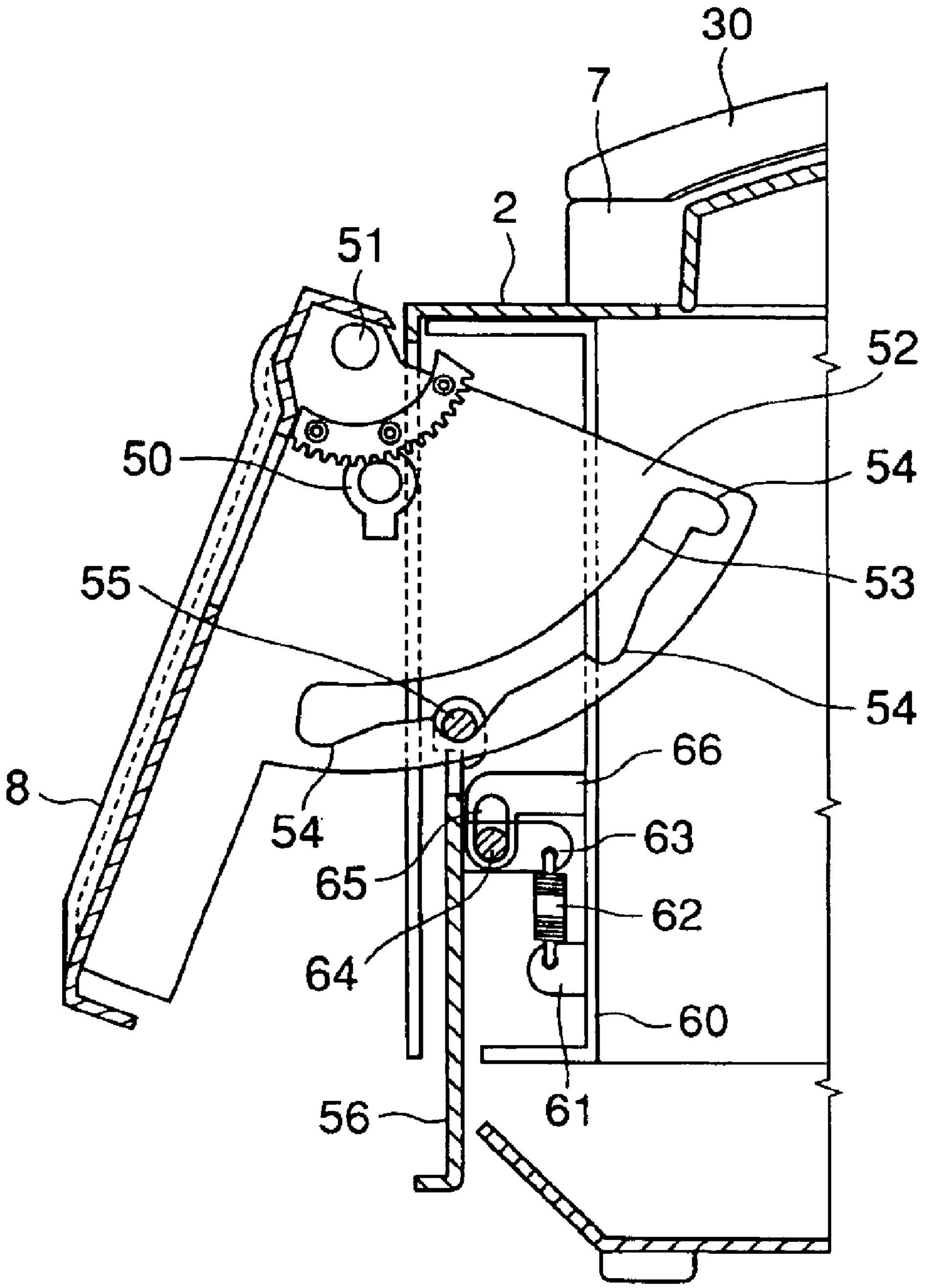
FIG. 17 is a sectional view showing a state in which the operation panel is held in an angle adjustment groove second from bottom.
Figure 18:
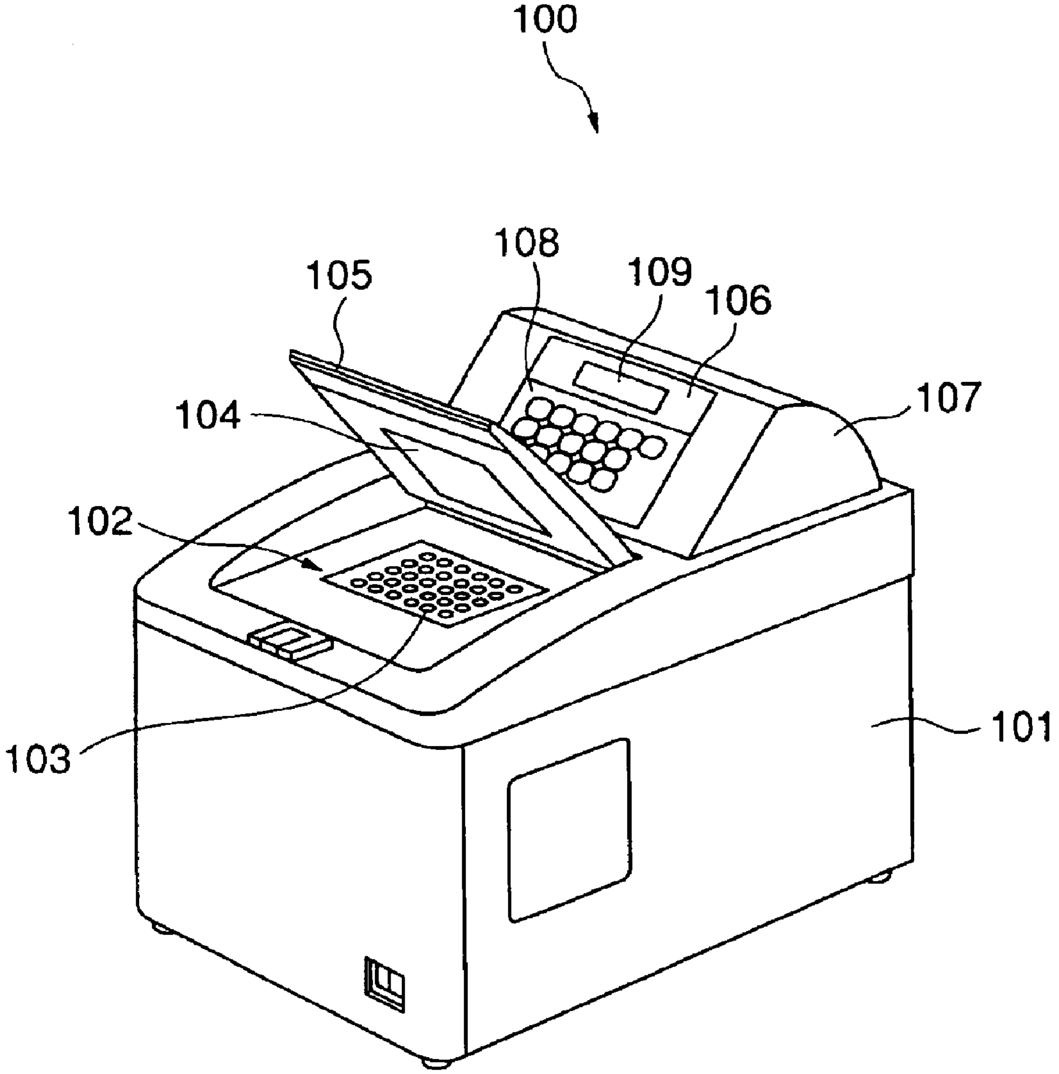
FIG. 18 is a perspective view of a conventional incubator.

Then, as shown in FIG. 16, by rotating the operation panel 8 forward around the rotary shaft 51 from this state, the support shaft 55 is moved in the engaging groove 53 of the support plate 52, whereby an inclined angle can be formed in the operation panel 8 with respect to the incubator body 2. The support shaft 55 is locked in one of the angle adjustment grooves 54, the angle adjustment groove 54 second from the front in FIG. 16, to release the operation lever 56. Thus, as shown in FIG. 17, the operation lever 56, and the operation lever holding section 64 disposed in the connection member 63 are pulled down by the pressing force of the spring member 62, and the support shaft 55 disposed on the upper end of the operation lever 56 is held in the angle adjustment groove 54.

The operation panel 8 which comprises the display section 9 and the operation section 10 can be easily adjusted for an angle with respect to the incubator body 2. Thus, even if a plurality of incubators 1 are installed on a shelf to save space, the display section 9 can be adjusted to an angle to be easily seen, and the operation section 10 can be adjusted to an angle to be easily operated. As a result, usability of the incubator is improved.

According to the embodiment, the operation panel 8 in which the display section 9 and the operation section 10 are both disposed can be adjusted for an angle. In addition, only the display section 9, or only the operation section 10, may be adjusted for an angle.

According to the embodiment, since the plurality of angle adjustment grooves 54 are formed in the support plate 52, the operation panel 8 can be adjusted for an angle with respect to the incubator body 2 at a plurality of stages. Thus, usability of the incubator is further improved.

Furthermore, according to the embodiment, since the oil damper 50 is disposed in the rotary shaft 51, even if the support shaft 55 is omitted from the angle adjustment groove 54, it is possible to prevent damage caused by sudden rotation of the operation panel 8.

As discussed in detail above, according to the invention of the first aspect, the incubator comprises the reaction chamber disposed in the incubator body; the heat conductive reaction block disposed in the reaction chamber to hold one or plural vessels containing the reaction samples; the cover for covering the upper part of the reaction chamber in an openable manner; the upper heating means positioned on the lower surface of the cover to heat the upper part of the vessel held by the reaction block; and the pressure means for pressing the upper heating means to the vessel side. In this case, the reaction block is heated/cooled while the upper part of the vessel is heated by the upper heating means to incubate the reaction sample, and the cover is rotated and freely moved in the horizontal direction with respect to the incubator body. Thus, it is possible to release pressure applied by the upper heating means to the vessel side and simplify the opening/closing structure of the reaction chamber.

According to the invention of the second aspect, the cover is rotated to be freely brought into contact with and separated from the vessel held by the reaction block, separated from the vessel, and moved in the horizontal direction in the state in which the lower surface thereof is down to open the upper part of the reaction chamber. Thus, since the upper heating means disposed on the lower surface of the cover is moved in the horizontal direction with its face down when the cover is opened, it is possible to prevent burning of the worker by the upper heating means.

According to the invention of the third aspect, the pressing means is disposed to be abutted on the cap peripheral edge of the vessel, and the pressing means is movable with respect to the upper heating means. Thus, it is possible to prevent opening of the cap of the vessel by the pressing means. Moreover, since the pressing means is movable with respect to the upper heating means, the amount of pressure (amount of crushing) to the cap of the vessel can be regulated, and no particular alignment of the pressing means is necessary. Thus, convenience of the incubator is improved.

According to the invention of the fourth aspect, the pressing means is attached to the lower surface of the upper heating means, and held in the neutral position or the fixed position in the separated state from the vessel. Thus, the pressing means is smoothly moved to facilitate alignment with the vessel.

According to the invention of the fifth aspect, the pressing means is the plate material in which one or plural through-holes are formed. Thus, the upper heating means can be abutted on the vessel by the simple structure without any troubles.

According to the invention of the sixth aspect, the pressing means is the plate material in which one or plural concaves are formed. Hence, heat can be conducted from the upper heating means through the pressing means to the vessel by the simple structure without any troubles.

According to the invention of the seventh aspect, the incubator comprises the reaction chamber disposed in the incubator body; the heat conductive reaction block disposed in the reaction chamber to hold one or plural vessels containing the reaction samples; and the cover for covering the upper part of the reaction chamber in an openable manner. In this case, the reaction block is heated/cooled to incubate the reaction sample, and the display section disposed in the incubator body to display the incubation state is attached to the incubator body so as to be adjusted for an angle. Thus, the display section can be adjusted to an angle to be easily seen when a plurality of devices are installed on a shelf or the like to save space. Accordingly, usability of the incubator is improved.

According to the invention of the eighth aspect, the incubator comprises the reaction chamber disposed in the incubator body; the heat conductive reaction block disposed in the reaction chamber to hold one or plural vessels containing the reaction samples; and the cover for covering the upper part of the reaction chamber in an openable manner. In this case, the reaction block is heated/cooled to incubate the reaction sample, and the operation section disposed in the incubator body to set the incubation state is attached to the incubator body so as to be adjusted for an angle. Thus, the operation section can be adjusted to an angle to be easily used when a plurality of devices are installed on a shelf or the like to save space. Accordingly, usability of the incubator is improved.

According to the invention of the ninth aspect, the incubator comprises the reaction chamber disposed in the incubator body; the heat conductive reaction block disposed in the reaction chamber to hold one or plural vessels containing the reaction samples; and the cover for covering the upper part of the reaction chamber in an openable manner. In this case, the reaction block is heated/cooled to incubate the reaction sample, and the operation panel which comprises the display section for displaying the incubation state and the operation section for setting the incubation state and which is disposed in the incubator body is attached to the incubator body so as to be adjusted for an angle. Hence, the operation panel can be adjusted to an angle to be easily seen and used when a plurality of devices are installed on a shelf to save space. Accordingly, usability of the incubator is improved.

According to the invention of the tenth aspect, since the display section, the operation section or the operation panel can be adjusted for an angle with respect to the incubator body at the plurality of stages, the angle can be easily adjusted in accordance with an installation place. Thus, usability of the incubator is further improved.

What is claimed is:

1. An incubator comprising:

a reaction chamber disposed in an incubator body; a heat conductive reaction block disposed in the reaction chamber to hold one or plural vessels containing reaction samples;

a cover for covering an upper part of the reaction chamber in an openable manner;

upper heating means positioned on a lower surface of the cover to heat an upper part of the vessel held by the reaction block; and pressure means for pressing the upper heating means to the vessel side;

the reaction block being heated/cooled while the upper part of the vessel is heated by the upper heating means, to incubate the reaction sample;

wherein the cover is disposed rotatably and movably in a horizontal direction with respect to the incubator body; and wherein the cover is rotatable to be freely brought into contact with and separated from the vessel held by the reaction block, and is movable in the horizontal direction in a state in which a lower surface thereof is down, to open the upper part of the reaction chamber.

2. The incubator according to claim 1, further comprising:

pressing means abutted on a cap peripheral edge of the vessel, and wherein the pressing means is movable with respect to the upper heating means.

3. The incubator according to claim 2, wherein the pressing means is attached to a lower surface of the upper heating means, and held in a neutral position or a fixed position in a separated state from the vessel.

4. The incubator according to claim 2 or 3, wherein the pressing means is a plate material in which one or plural through-holes are formed.

5. The incubator according to claim 2 or 3, wherein the pressing means is a plate material in which one or plural concaves are formed.

6. The incubator according to claim 1 and further comprising:

a display section disposed in the incubator body to display an incubation state, and attached to the incubator body in such a manner that an angle to the incubator body is adjustable.

7. The incubator according to claim 1 and further comprising:

an operation section disposed in the incubator body to set an incubation state, and attached to the incubator body in such a manner that an angle to the incubator body is adjustable.

8. The incubator according to claim 1 and further comprising:

an operation panel comprising a display section for displaying an incubation state and an operation section for setting the incubation state disposed in the incubator body, and the operation panel is attached to the incubator body in such a manner that an angle to the incubator body is adjustable.

9. The incubator according to claim 6, 7 or 8, wherein the display section, the operation section or the operation panel is adjustable at a plurality of stages to the incubator body.

* * * * *